United States Patent
Eloy et al.

(10) Patent No.: US 11,946,424 B2
(45) Date of Patent: Apr. 2, 2024

(54) PROCESSING METHOD OF A CAMSHAFT SENSOR

(71) Applicant: VITESCO TECHNOLOGIES GmbH, Regensburg (DE)

(72) Inventors: Stéphane Eloy, Toulouse (FR); Benjamin Marconato, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 48 days.

(21) Appl. No.: 17/630,948

(22) PCT Filed: Jul. 16, 2020

(86) PCT No.: PCT/EP2020/070168
§ 371 (c)(1),
(2) Date: Jan. 28, 2022

(87) PCT Pub. No.: WO2021/028147
PCT Pub. Date: Feb. 18, 2021

(65) Prior Publication Data
US 2022/0275764 A1 Sep. 1, 2022

(30) Foreign Application Priority Data
Aug. 9, 2019 (FR) ...................... 1909112

(51) Int. Cl.
*F02D 41/00* (2006.01)
*F02D 13/02* (2006.01)

(52) U.S. Cl.
CPC ....... *F02D 41/009* (2013.01); *F02D 13/0215* (2013.01); *F02D 2200/101* (2013.01)

(58) Field of Classification Search
CPC ............... F02D 41/009; F02D 41/1441; F02D 41/1439; F02D 41/144; F02D 41/1497;
(Continued)

(56) References Cited

U.S. PATENT DOCUMENTS 6,035,826 A * 3/2000 Matsuoka ............... F02P 7/067
123/406.62
9,371,794 B2 6/2016 Schüle
(Continued)

FOREIGN PATENT DOCUMENTS

CN 104895673 A 9/2015
CN 105888842 8/2016
(Continued)

OTHER PUBLICATIONS

International Search Report for PCT/EP2020/070168 dated Sep. 9, 2020, 5 pages.
(Continued)

*Primary Examiner* — Shafiq Mian
*Assistant Examiner* — Dapinder Singh
(74) *Attorney, Agent, or Firm* — NIXON & VANDERHYE

(57) ABSTRACT

A processing method for a camshaft sensor including a toothed wheel, rotationally integral with a camshaft, rotating in front of a fixed sensing element capable of transmitting a signal indicating the profile of the toothed wheel, the method including the following steps: receiving a tooth edge, identifying the corresponding index, performing at least one first processing operation using each index, further including the following steps: qualifying an index and performing at least one second processing operation using the index, if it is qualified.

20 Claims, 3 Drawing Sheets

(58) Field of Classification Search
CPC .......... F02D 13/0215; F02D 2200/101; F02D 2200/50; Y02T 10/12; Y02T 10/40
See application file for complete search history.

(56) References Cited

U.S. PATENT DOCUMENTS

| | | | |
|---|---|---|---|
| 10,533,509 B2 | 1/2020 | Zouboff | |
| 10,634,077 B2 * | 4/2020 | Mazenc | ............. F02D 41/0097 |
| 2002/0157649 A1 * | 10/2002 | Zimmermann | ....... F02D 41/222 |
| | | | 123/478 |
| 2013/0206108 A1 | 8/2013 | Schuele | |
| 2015/0114097 A1 * | 4/2015 | Zouboff | ............... F02D 41/009 |
| | | | 73/114.26 |
| 2018/0274397 A1 * | 9/2018 | Pochner | .................. F02D 41/20 |
| 2018/0372010 A1 | 12/2018 | Zouboff | |

FOREIGN PATENT DOCUMENTS

| | | |
|---|---|---|
| DE | 10 2014 203 795 | 9/2015 |
| FR | 3 045 728 | 6/2017 |
| GB | 2 272 973 | 6/1994 |
| WO | 2017102074 A1 | 6/2017 |
| WO | 2018/109288 | 6/2018 |

OTHER PUBLICATIONS

Written Opinion of the ISA for PCT/EP2020/070168 dated Sep. 9, 2020, 7 pages.
Office Action, issued in Chinese Patent Application No. 202080056236.0 dated Nov. 28, 2023.

* cited by examiner

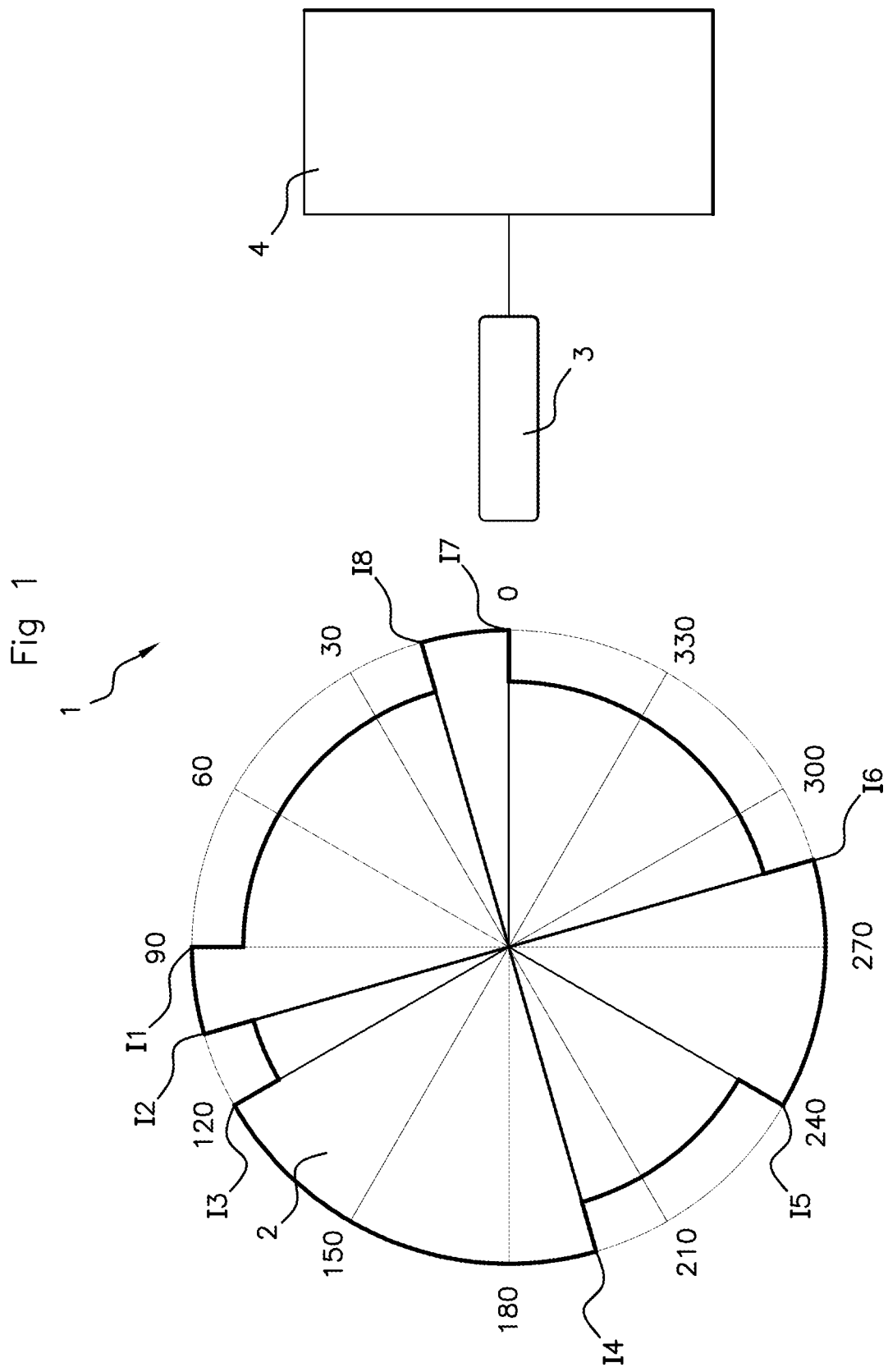

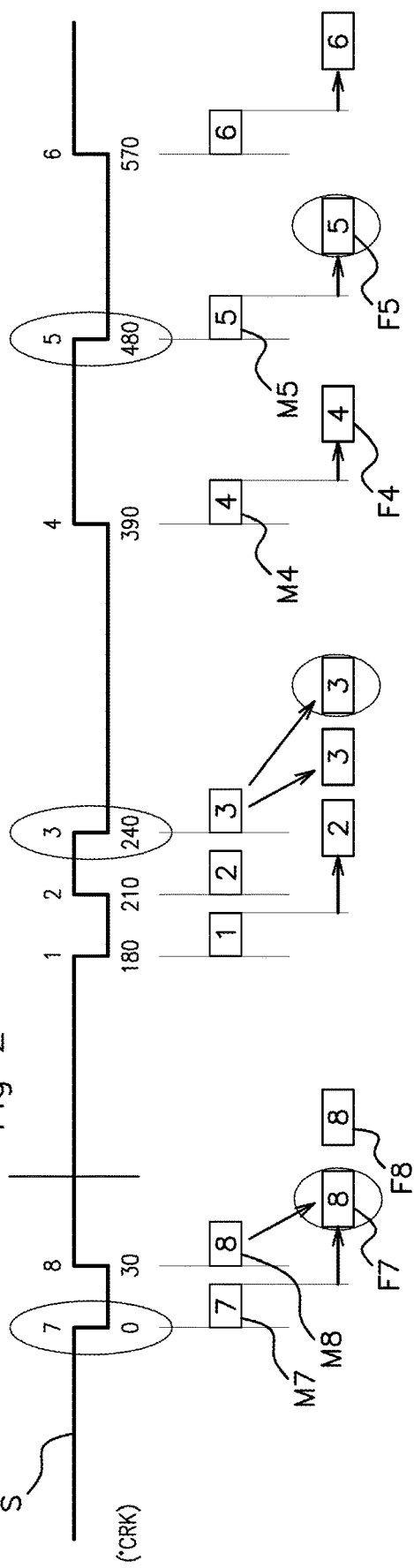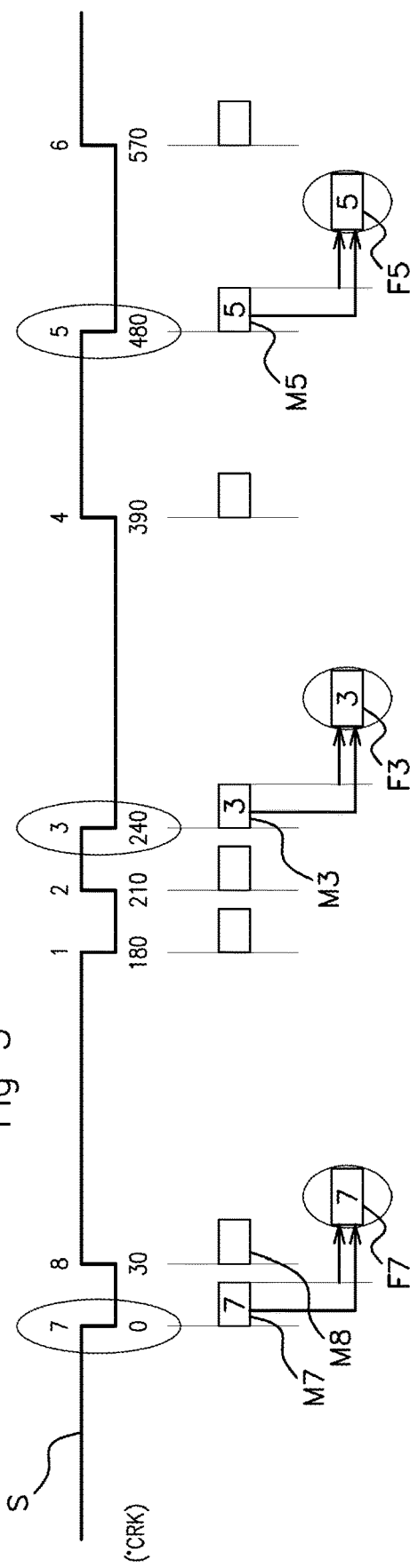

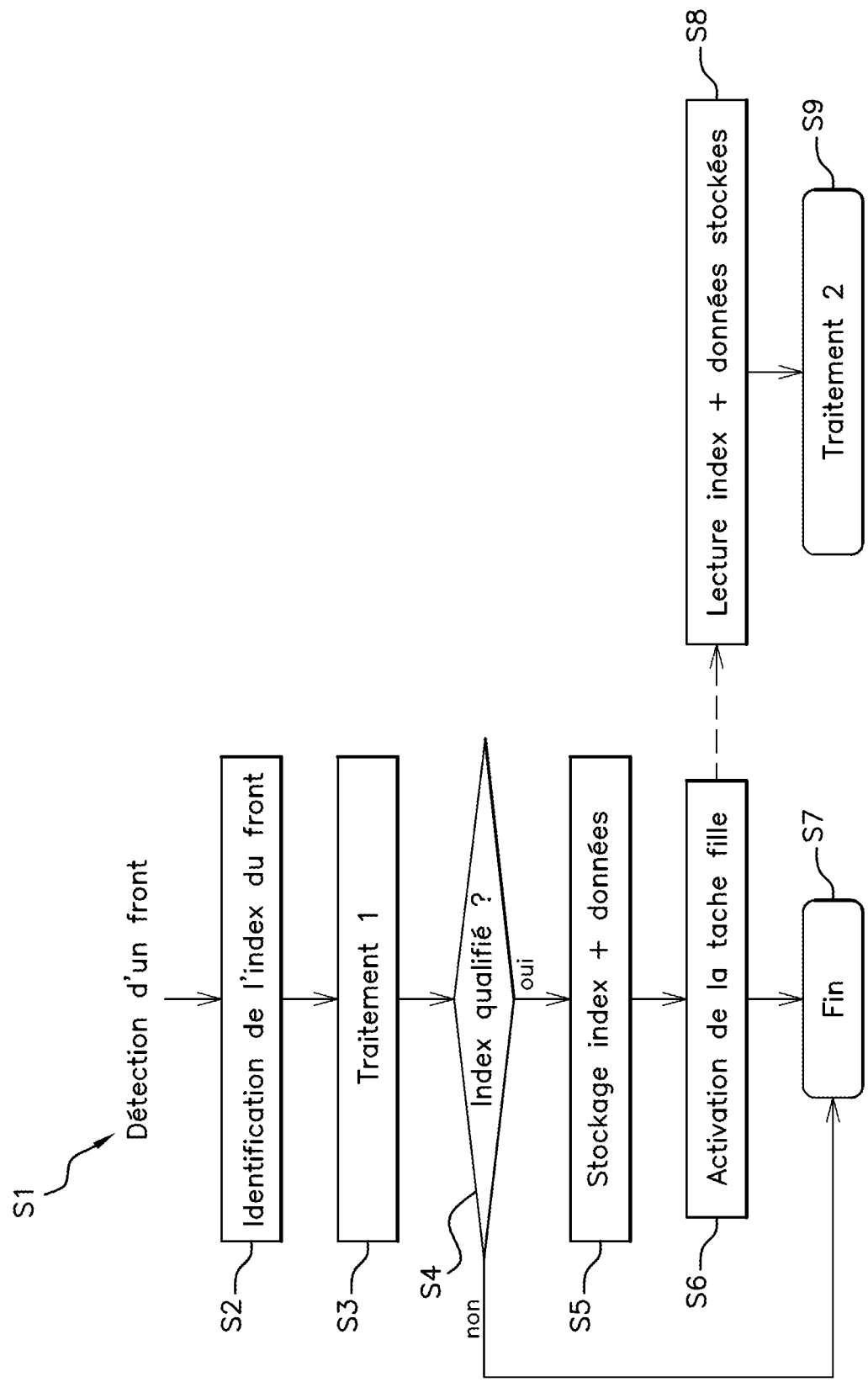

PROCESSING METHOD OF A CAMSHAFT SENSOR

CROSS-REFERENCE TO RELATED APPLICATIONS

This application is the U.S. national phase of International Application No. PCT/EP2020/070168 filed Jul. 16, 2020 which designated the U.S. and claims priority to FR Patent Application No. 1909112 filed Aug. 9, 2019, the entire contents of each of which are hereby incorporated by reference.

BACKGROUND OF THE INVENTION

Field of the Invention

The invention relates to processing a camshaft sensor.

Description of the Related Art

A camshaft sensor in a known manner comprises a toothed wheel, comprising a small number of teeth that are mostly uneven and/or are unevenly spaced apart around the circumference. This toothed wheel is rotationally integral with a camshaft. A sensing element that is fixed relative to the engine and is capable of detecting a tooth edge is disposed opposite the toothed wheel. The sensing element is capable of transmitting a signal indicating the profile of the toothed wheel in that it comprises the same tooth edges. Each tooth edge is characterized by its index.

This signal is processed by a computation device. The problem is that the signal containing the tooth edges exhibits variable recurrence, having a pseudo-period decreasing with the speed of rotation of the engine. Furthermore, when the engine speed reaches significant values, the computation device can become congested and it is no longer capable of processing all incoming tooth edges in the allotted time. A new edge then can be received before the previous edge has been processed.

The particular purpose of processing incoming tooth edges is to determine the index of each edge, namely to identify each edge. This index associated with the angular position of the engine is used by the algorithms for controlling variable distribution. Furthermore, not processing a tooth edge has detrimental consequences in that it shifts the perception by the method for controlling variable distribution by as much. This subsequently distorts all processing operations based on said angular position.

SUMMARY OF THE INVENTION

There is a real need for a processing method without the flaws, disadvantages and challenges of the prior art.

In order to solve one or more of the aforementioned disadvantages, the invention proposes a processing method for a camshaft sensor comprising a toothed wheel, rotationally integral with a camshaft, rotating in front of a fixed sensing element capable of transmitting a signal indicating the profile of the toothed wheel, each tooth edge of said toothed wheel being characterized by its index, an index being a sequence number of a tooth edge on the toothed wheel of the camshaft sensor, the method comprising the following steps: receiving a tooth edge, identifying the corresponding index, performing at least one first processing operation using each index, further comprising the following steps: qualifying an index, said qualification step being a selection step, selecting from all the indices, that retains an index that is then called qualified index or that does not retain said index, and performing at least one second processing operation using said index, if it is qualified.

Particular features or embodiments, which can be used independently or in combination, are:
- the qualification step qualifies an index according to a frequency criterion by qualifying one index in n, according to a criterion of minimum elapsed time since a previous qualified index, according to a criterion of angular distance relative to a previous qualified index or even according to a predefined list of indices,
- the qualification step qualifies equidistant indices,
- the number n is an increasing function of the engine speed,
- if the method is implemented in a multiprocessor or multi-core environment, the identification step, the qualification step and the performance step of at least one first processing operation are performed on a first processor or core, preferably by a parent task, and the completion of at least one second processing operation is performed on another processor or core, preferably by a child task of the parent task, the child task not being triggered for a non-qualified index,
- the method further comprises a step of storing an index a first time for the attention of said at least one first processing operation and separately at least a second time for the attention of said at least one second processing operation,
- said at least one first processing operation comprises determining an engine speed,
- said at least one second processing operation comprises controlling a variable distribution.

BRIEF DESCRIPTION OF THE DRAWINGS

The invention will be better understood upon reading the following description, which is provided solely by way of an example, and with reference to the appended figures, in which:

FIG. 1 shows a camshaft sensor and its processing device,
FIG. 2 shows the signal S and its processing according to the prior art,
FIG. 3 shows the signal S and its processing according to the invention,
FIG. 4a shows a flow chart illustrating the part of the method performed on a first core,
FIG. 4b shows a flow chart illustrating the part of the method performed on a second core, the two flow charts being connected by a dotted line arrow.

DESCRIPTION OF THE PREFERRED EMBODIMENTS

With reference to FIG. 1, a camshaft sensor 1 comprises a toothed wheel 2 comprising a small number of mostly uneven teeth. This toothed wheel 2 is rotationally integral with a camshaft. The toothed wheel 2 rotates in front of a sensing element 3 that is fixed relative to the engine. The sensing element 3 is capable of detecting a tooth edge and of transmitting a signal S indicating the profile of the toothed wheel 2 in that it has the same tooth edges as a function of time. An example of such a signal S, obtained for the camshaft sensor 1 of FIG. 1, is illustrated in FIG. 2 or 3. A processing device 4 receives said signal S and performs its processing.

A method for processing such a signal S originating from a camshaft sensor 1 comprises, in a known manner, the following steps: receiving S1 a tooth edge transmitted via the signal S, identifying S2 the index I1-I8 corresponding to the received tooth edge, performing S3 at least one first processing operation using each index I1-I8. An index I1-I8 is a sequence number of a tooth edge on the toothed wheel 2 of the camshaft sensor 1. The index is absolute and periodic throughout one revolution of said toothed wheel 2.

The toothed wheel 2 of FIG. 1 is angularly graduated in degrees ° (angle) representing 360° for one revolution of the toothed wheel 2 of the camshaft. The signal S of FIGS. 2 and 3, as a function of time, bears marks in corresponding degrees of rotation of the crankshaft or degrees CRK or ° CRK. Moreover, the signal S is inverted: a rising edge of the toothed wheel 2 appears to be descending and vice versa. A ° CRK is, in a known manner, a double °, since a camshaft completes one revolution when the engine/crankshaft (or "crank", CRK) completes two revolutions. The first index I1 corresponds to the rising edge located at 90° or 180° CRK. The second index I2 corresponds to the falling edge located at 105° or 210° CRK. The third index I3 corresponds to the rising edge located at 120° or 240° CRK. The fourth index I4 corresponds to the falling edge located at 195° or 390° CRK. The fifth index I5 corresponds to the rising edge located at 240° or 480° CRK. The sixth index I6 corresponds to the falling edge located at 285° or 570° CRK. The seventh index I7 corresponds to the rising edge located at 0° or 0° CRK. The eighth index I8 corresponds to the falling edge located at 15° or 30° CRK.

The processing method can use all the tooth edges. In this case, an index is assigned to each tooth edge. Alternatively, the processing method can only use certain tooth edges. According to an example of this embodiment, the processing method uses only the rising edges or only the falling edges. In this case, the other type of edge is simply ignored during identification and is not assigned an index.

According to the prior art, all the processing operations using at least one index I1-I8 are systematically performed at each index. This can be seen as one of the causes of the congestion of the processing device 4 and of the problem.

In order to decongest the processing device 4, the invention proposes dividing the processing operations using at least one index I1-I8 into at least two categories. A first category of processing operations comprises the first processing operations that absolutely must use and process all the indices. The first processing operations, of this first category, are triggered and performed, like the prior art, at each index I1-I8. At least one second category of processing operations comprises the second processing operations that can only use and process some from among all the indices, which are referred to as qualified indices. The second processing operations, of this or these category(ies), are then advantageously triggered and performed only for a qualified index. An index is qualified during a qualification step S4.

The qualification step S4 is a selection step, selecting from all the indices I1-I8, that retains an index that is then called qualified index or that does not retain said index. The subset of the qualified indices advantageously has a small cardinal relative to all the indices I1-I8. By only triggering and performing the processing operations associated with these qualified indices, the method according to the invention decreases the number of processing operations and thus allows the congestion of the processing device 4 to be avoided or at least delayed.

The qualification step S4 can be performed using any selection mode. Similarly, several qualification steps can be performed, according to criteria that can be different criteria and each qualification step is associated with one of the second specific processing operations.

By way of an illustration, a frequency criterion can be used for the qualification. In this case, the qualification step retains one index in n, with n being any integer that is at least equal to 2. Thus, when a first index is qualified, the n−1 indices that immediately follow are ignored by the qualification step and cannot be qualified.

A criterion of minimum elapsed time from a previous qualified index still can be used. Thus, when a first index is qualified, the one or more indices that immediately follow that are included in a given time window are ignored by the qualification step and cannot be qualified. Such a criterion is advantageous in that congestion of the processing device 4 is much more likely when the indices, and the optionally associated processing operations, are temporally close.

A criterion of angular distance relative to a previous qualified index still can be used. The profile of the toothed wheel 2 is known. Furthermore, when the index I1-I8 corresponding to a tooth edge is identified, the angular distance present between said edge and the immediately preceding or immediately following edge is known. Thus, when a first index is qualified, the one or more indices that immediately follow that have a certain angular distance with said qualified index are ignored by the qualification step and cannot be qualified. The angular distance can be a minimum distance. Thus, when a first index is qualified, the one or more indices that immediately follow that are in a given angular window after said qualified index are ignored by the qualification step and cannot be qualified. Such a criterion is advantageous in that congestion of the processing device 4 is much more likely when the indices, and the optionally associated processing operations, are temporally close, with the temporal proximity being able, as a function of the engine speed, to be derived from an angular proximity.

A criterion for arbitrary selection of certain indices still can be used, such as, for example, according to a predefined list of indices. Such a list advantageously is periodic. Thus, with a list (I1, I6) only the indices I1 and I6 can be qualified, which has the effect of reducing the number of second processing operations by a third.

According to a particularly advantageous feature, the criterion for qualifying an index is the equidistance. The qualification step qualifies the equidistant indices. In most cases, a toothed wheel 2 is shaped so as to have angularly equidistant edges and more advantageously modulo the number of cylinders of the engine. Thus, the toothed wheel 2 illustrated in FIG. 1 has three rising edges, with respective indices 3, 5 and 7 that are equidistant by 240° CRK or 120°, suitable for a three-cylinder engine. It also has four falling edges, with respective indices 2, 4, 6 and 8 that are equidistant by 180° CRK or 90°, suitable for a four-cylinder engine. By qualifying only the equidistant indices, the method respectively reduces the number of second processing operations by ⅜ (3 cylinders) or by ½ (4 cylinders).

The equidistant indices have the advantage of being evenly spaced apart angularly and also of being in sync with the operation of each cylinder of the engine. This ensures smooth sampling of the signal, which ensures equivalent dynamics of the result. Thus, considering the equidistant indices ensures sub-sampling, with respect to all the indices I1-I8, advantageously according to a regular pseudo-period. Also, at a constant engine speed, the times measured between these equidistant indices are equal.

The various qualification criteria still can be combined together. It is thus possible to qualify one index in n indices verifying a criterion of temporal and/or angular distance. It is still possible to retain only the indices verifying a criterion of temporal distance and to qualify only one index in n from among those that are retained. A person skilled in the art in this case will know to multiply the combinations of two or more criteria.

According to another feature, rather than a constant number n, the frequency criterion can be applied with a number n, advantageously increasing, that is a function of the engine speed. Thus, for example, at low speed, n can be taken as equal to 1. With the engine slowly running, all the indices are qualified. At low speed there is little risk of congesting the processing device 4. However, a minimum number of indices is necessary to ensure the dynamics of the results of the one or more second processing operations. At higher speed, n can be taken as equal to 3. With the engine running faster, the number of qualified indices can be reduced. This can reduce the risks of congesting the processing device 4, yet without disrupting the dynamics of the results. At high speed, n can be taken as equal to 10. With the engine running even faster, the number of qualified indices can be reduced further. This can reduce the risks of congesting the processing device 4, yet without disrupting the dynamics of the results. It can be inferred that such a feature allows the influence of the engine speed to be corrected by attempting to average out the pseudo-frequency of the qualified indices. The preceding example uses three engine speed levels, any number can be used.

It is clearly possible to combine this latter feature with the other qualification criteria.

Thus, according to a particularly advantageous feature, it is possible to retain only the equidistant indices and to qualify them on the basis of a frequency criterion, with n being a function of the engine speed. Thus, for example, n can be taken as equal to 1 at low speed, to 2 at average speed and to 4 at high speed. Thus, for a 4-cylinder engine all the equidistant indices are qualified: I2, I4, I6, I8 at low speed, only the indices I2, I6 or I4, I8 at average speed, and only one of the four indices at high speed. In this case, the equidistant indices are advantageous in that the indices thus selected according to a frequency criterion remain equidistant.

Currently, engine control processing operations, and among them the camshaft sensor processing operations, are implemented by multi-processor processing devices 8, either comprising a plurality of processors, or comprising at least one multi-core processor.

In this case, the identification step S2, the qualification step S4 and the performance step S3 of at least one processing operation using each index are advantageously performed on a first processor or core, preferably by a parent task, and the completion S9 of at least one processing operation using a qualified index is advantageously performed on another processor or core, preferably by a child task of the mother task.

FIGS. 2 and 3 illustrate the operation of such a multiprocessor or multi-core device. A first line corresponding to the first processing operation performed by a first core and a second line corresponding to the second processing operation are shown below and opposite the signal S.

FIG. 2 illustrates a possible problem of congestion when the indices are not qualified and the second processing operations are performed for each index.

In a nominal case, following the received edge 4, a corresponding mother task M4 is triggered. It identifies the edge: I4, registers this index in a memory shared with the child tasks and triggers the execution of a corresponding child task F4. The corresponding child task F4 rereads the index I4 in the shared memory and uses it to perform its second processing operation. For the next received edge 5, a corresponding mother task M5 is triggered. It identifies the edge: I5, registers this index in the shared memory and triggers the execution of a corresponding child task F5. The corresponding child task F5 rereads the index I5 in the shared memory and uses it to perform its second processing operation.

When two successive edges become too close in time, due to the angular proximity of the edges on the toothed wheel 2 and the increase in the speed of rotation of the camshaft and of the toothed wheel 2, the next problematic case can occur. After the received edge 7 is received, a corresponding mother task M7 is triggered. It identifies the edge: I7, registers this index in a memory shared with the child tasks and triggers the execution of a corresponding child task F7. However, the child task F7 is sufficiently delayed to allow the next edge 8 to arrive. Upon receipt of this next edge 8, a corresponding mother task M8 is triggered. It identifies the edge: I8, registers this index in the shared memory and triggers the execution of a corresponding child task F8. This second registration superimposes and thus deletes the previous index I7 from the shared memory. Furthermore, the child task F7, when it is finally executed, rereads an index I8 in the shared memory instead of a nominal index I7. This modification disrupts the proper execution of the child task F7, which performs a processing operation on inconsistent information. The child task F8 also rereads the index I8 in the shared memory and uses it to perform its second processing operation.

By contrast, FIG. 3 illustrates a use of a qualification. A list for qualifying indices is used: I3, I5 and I7, in this case equidistant. After the received edge 7 is received, the corresponding mother task M7 is triggered. It identifies the edge: I7. With the edge I7 being qualified, it registers this index in the shared memory of the child tasks and triggers the execution of the corresponding child task F7. Upon receipt of the next edge 8, a corresponding mother task M8 is triggered. It identifies the edge: I8. However, this index I8 is not qualified, also the mother task M8 does not register this index in the shared memory or registers it in a different shared memory so as to protect the registration of the previous index I7 and does not trigger the execution of a child task F8. Furthermore, the child task F7, even if it is delayed with respect to the parent task M8, rereads the good index I7 in the shared memory and can perform its second processing operation correctly. The same is the case for the other qualified indices I3, I5 with the respective tasks M3, F3, M5, F5.

The qualification thus allows unessential child tasks to be removed and therefore allows the risk of congesting the second core to be reduced, thus limiting the risk of having a delayed child task. More generally, the main advantage of the invention is in that it qualifies a subset of the indices I1-I8 and reduces the load of the processing device 4 by removing a significant number from the second processing operations. This is advantageously performed on processing operations that allow it and thus without affecting the functionalities. The optional core or processor on which these deleted processing operations were running thus becomes more responsive. The waiting time between mother and child tasks is thus improved. Advantageously, this means that the execution of a processing operation that is retained since it is qualified (in that it corresponds to a qualified index) is performed temporally closer to the engine position to which it relates.

According to a first feature, seen in the previous example, a parent task, during the identification step, does not store a non-qualified index in the shared memory, in order to avoid any risk of re-registration, with such re-registration erasing a previous registration and being capable of creating a consistency problem. This is a first mechanism that allows a qualified index to be protected that is registered in the shared memory until it is reread by the child task performing a second processing operation.

According to another alternative feature, if the identification step systematically registers/stores an index in a first shared memory, at least one second shared memory is advantageously provided for storing only the qualified indices. This forms another mechanism for protecting qualified indices. The identification step stores an index for a first time, in a first shared memory, for the attention of said at least one first processing operation. Furthermore, in the case of a qualified index, the identification step stores said qualified index at least for a second time in said at least one second shared memory for the attention of said at least one second processing operation.

A single first memory advantageously can be used for the first storage step. For said at least one second shared memory, providing at least one for each second processing operation is advantageous. This is particularly advantageous if second processing operations use different qualifications, in order to mutually protect their respective qualified indices.

A first processing operation is a processing operation systematically using all the indices. A first processing operation imperatively comprises the identification step S2, but also the qualification step S4. A first indicative processing operation comprises determining the engine speed. Such determining of the engine speed is generally performed in order to make a nominal determination performed by processing a crankshaft sensor redundant. Due to the small number of edges on a toothed wheel 2, it is preferable for all the edges/indices to be used. Such processing is advantageously performed by the parent tasks.

A second processing operation is processing using only the qualified indices. An example of a second processing operation is controlling the variable distribution. Such processing is advantageously performed by the child tasks.

Variable distribution is a known technology allowing, by varying the angular position of the camshaft relative to the engine/crankshaft, several parameters influencing engine control to be varied: the timing, "variable valve timing", better known by its acronym VVT, the opening and/or lift duration, "variable valve lift", of the intake and exhaust valves. These parameters are controlled as a function of the speed, the load and the acceleration demand. The benefits of variable distribution are high torque at low speed, high power at high speed, better efficiency (allowing the engine to operate in the Atkinson cycle and pumping losses to be decreased) and less pollution.

VVT changes as a function of the speed. It phase-shifts the camshaft relative to the crankshaft. This phase-shifting is controlled by the engine control. Controlling the VVT is an example of a second processing operation advantageously performed by the child tasks of the processing device 4 by using the qualified indices.

FIGS. 4 and 5 illustrate flow charts of an embodiment of a processing method according to the invention. FIG. 4 shows the steps preferably executed on the first core/by a mother task. The first step S1 receives the signal S and detects an edge. The second step S2 identifies the index corresponding to this edge. The third step S3 performs the one or more first processing operations, that is the processing operations that are performed and that use all the indices. The fourth step S4 checks whether the index identified in the previous step S2 is qualified. If it is not qualified, the method branches to the end S7 and is terminated. If it is qualified, the method branches to step S5, which stores the qualified index in at least one shared memory, as well as the data that is optionally useful for the second processing operation(s). The method then proceeds to perform the second processing operation(s). If the method is executed in a multiprocessor or multi-core environment, this occurs by a controlled transition to a child task, performed by step S6, which activates said child task, performed on another core.

FIG. 4b shows the steps performed on the other core by the child task. Step S8 rereads, from the shared memory, the qualified index and the data stored in step S5. Step S9 performs the one or more second processing operation(s).

The invention has been illustrated and described in detail in the drawings and the above description. This should be considered as illustrative and provided by way of an example and not as limiting the invention to this description only. Many variant embodiments are possible.

LIST OF REFERENCE SIGNS

1: camshaft sensor,
2: toothed wheel,
3: sensing element,
4: processing device,
S: signal originating from the sensing element 3,
I1-I8: index,
F3, F4, F5, F7, F8: child tasks,
M3, M4, M5, M7, M8: parent tasks,
S1-S9: steps of the method.

The invention claimed is:

1. A processing method for a camshaft sensor including a toothed wheel having a plurality of tooth edges, rotationally integral with a camshaft, rotating in front of a fixed sensing element configured to transmit a signal indicating a profile of the toothed wheel, each tooth edge of said toothed wheel being characterized by a respective index of said tooth edge, the respective index being a sequence number of the respective tooth edge on the toothed wheel of the camshaft sensor, the method comprising:
 receiving a respective one of the tooth edges of the plurality of tooth edges;
 identifying the corresponding index corresponding to the respective received tooth edge;
 performing at least one first processing operation using each of the identified indices;
 qualifying one index by selecting from all the indices, and retaining the qualified index or not retaining said qualified index; and
 completing at least one second processing operation using said qualified index.

2. The method as claimed in claim 1, wherein the one index of the plurality of indices is qualified according to a frequency criterion by qualifying the one index in n, according to a criterion of minimum elapsed time from a previous qualified index, according to a criterion of angular distance relative to a previous qualified index or according to a predefined list of indices, wherein n is any integer that is at least equal to 2.

3. The method as claimed in claim 2, wherein equidistant indices are qualified.

4. The method as claimed in claim 3, wherein the number n is an increasing function of the engine speed.

5. The method as claimed in claim 3, wherein the method is implemented in a multiprocessor or multi-core environment, and
wherein the identifying, the qualifying, and the performing are performed on a first processor or core, and the completing the at least one second processing operation is performed on another processor or core.

6. The method as claimed in claim 3, further comprising storing the respective index a first time for the at least one first processing operation and separately at least a second time for the at least one second processing operation.

7. The method as claimed in claim 3, wherein said at least one first processing operation comprises determining an engine speed.

8. The method as claimed in claim 2, wherein the number n is an increasing function of the engine speed.

9. The method as claimed in claim 8, wherein the method is implemented in a multiprocessor or multi-core environment, and
wherein the identifying, the qualifying, and the performing are performed on a first processor or core, and the completing the at least one second processing operation is performed on another processor or core.

10. The method as claimed in claim 8, further comprising storing the respective index a first time for the at least one first processing operation and separately at least a second time for the at least one second processing operation.

11. The method as claimed in claim 8, wherein said at least one first processing operation comprises determining an engine speed.

12. The method as claimed in claim 2, wherein the method is implemented in a multiprocessor or multi-core environment, and
wherein the identifying, the qualifying, and the performing are performed on a first processor or core, and the completing the at least one second processing operation is performed on another processor or core.

13. The method as claimed in claim 2, further comprising storing the respective index a first time for the at least one first processing operation and separately at least a second time for the at least one second processing operation.

14. The method as claimed in claim 2, wherein said at least one first processing operation comprises determining an engine speed.

15. The method as claimed in claim 1, wherein the method is implemented in a multiprocessor or multi-core environment, and
wherein the identifying, the qualifying, and the performing are performed on a first processor or core, and the completing the at least one second processing operation is performed on another processor or core.

16. The method as claimed in claim 15, further comprising storing the respective index a first time for the at least one first processing operation and separately at least a second time for the at least one second processing operation.

17. The method as claimed in claim 1, further comprising storing the respective index a first time for the at least one first processing operation and separately at least a second time for the at least one second processing operation.

18. The method as claimed in claim 1, wherein said at least one first processing operation comprises determining an engine speed.

19. The method as claimed in claim 1, wherein said at least one second processing operation comprises controlling a variable distribution.

20. The method as claimed in claim 1, wherein the method is implemented in a multiprocessor or multi-core environment, and
wherein the identifying, the qualifying, and the performing are performed on a first processor or core by a parent task, and the completing the at least one second processing operation is performed on another processor or core by a child task of the parent task, the child task not being triggered for an unqualified index.

* * * * *